(12) United States Patent
Keller et al.

(10) Patent No.: US 8,467,645 B2
(45) Date of Patent: Jun. 18, 2013

(54) FIBER OPTIC ARRANGEMENT USING FLAT WIDE WATER SWELLABLE BINDER FOR SUBUNIT ACCESS

(75) Inventors: David Keller, Cary, NC (US); Randie Yoder, Garner, NC (US); Terry Gooch, Holly Springs, NC (US)

(73) Assignee: Nexans, Paris (FR)

( * ) Notice: Subject to any disclaimer, the term of this patent is extended or adjusted under 35 U.S.C. 154(b) by 291 days.

(21) Appl. No.: 12/846,947

(22) Filed: Jul. 30, 2010

(65) Prior Publication Data

US 2011/0188819 A1  Aug. 4, 2011

Related U.S. Application Data

(60) Provisional application No. 61/235,575, filed on Aug. 20, 2009.

(51) Int. Cl.
*G02B 6/44* (2006.01)
(52) U.S. Cl.
USPC .......................................... 385/104; 385/111
(58) Field of Classification Search
USPC ........................ 385/103, 104, 105, 111, 112
See application file for complete search history.

(56) References Cited

U.S. PATENT DOCUMENTS

| | | | | |
|---|---|---|---|---|
| 5,649,043 A | * | 7/1997 | Adams et al. | 385/110 |
| 6,049,648 A | * | 4/2000 | Stokes et al. | 385/111 |
| 7,403,687 B2 | * | 7/2008 | Smith | 385/102 |
| 2002/0122640 A1 | * | 9/2002 | Strong et al. | 385/114 |
| 2002/0181906 A1 | * | 12/2002 | Hurley et al. | 385/102 |
| 2003/0123824 A1 | * | 7/2003 | Tatarka et al. | 385/113 |
| 2004/0240806 A1 | * | 12/2004 | Lail et al. | 385/100 |
| 2006/0147164 A1 | * | 7/2006 | Bau et al. | 385/111 |
| 2006/0193574 A1 | * | 8/2006 | Greenwood et al. | 385/103 |
| 2007/0009215 A1 | * | 1/2007 | Sales Casals | 385/101 |
| 2009/0169159 A1 | * | 7/2009 | Keller et al. | 385/110 |
| 2011/0211793 A1 | * | 9/2011 | Barrett et al. | 385/104 |

FOREIGN PATENT DOCUMENTS

JP        57-92304    *  6/1982

* cited by examiner

*Primary Examiner* — Charlie Peng
(74) *Attorney, Agent, or Firm* — Sofer & Haroun, LLP

(57) ABSTRACT

An assembly of fiber optic elements includes at least two subunits, each of which has at least one fiber optic unit and a flat binder wrapped over the subunits into an arrangement. The at least two subunits are stranded in a S-Z arrangement at a first lay length and the binder is stranded over the subunits in a uni-directional helical lay at a second lay length. The payoff tension and the first lay length of the subunits, combined with a payoff tension and the second lay length of the binder are simultaneously sufficient to hold the subunits within the arrangement, while being loose enough to allow a single subunit to be removed without destroying the arrangement.

14 Claims, 6 Drawing Sheets

FIBER OPTIC ARRANGEMENT USING FLAT WIDE WATER SWELLABLE BINDER FOR SUBUNIT ACCESS

RELATED APPLICATION

This application claims the benefit of priority from U.S. Provisional Patent Application No. 61/235,575, filed on Aug. 20, 2009, the entirety of which is incorporated by reference.

BACKGROUND

1. Field of the Invention

The present arrangement relates to fiber optic cables. More particularly, the present arrangement relates to tight buffer type fiber optic cables.

2. Description of Related Art

In the field of fiber optic cables, one form of fiber arrangement includes an assembly for use in the interior of a building, such as an apartment or multi-dwelling unit. In this arrangement, there is no outer jacket around the fibers, but rather the interior parts of the fiber optic cable are included in the form of bundled fibers within subunits. For the purposes of this application a subunit is broadly defined as any independent fiber containing unit within the context of a larger fiber containing structure.

In place of a jacket for protection, the grouping of subunits is placed within an open or closed-top conduit tray. The tray is normally made from assemblies which are of various sizes and shapes (typically rectangular), some straight and some curved, secured to the wall with glue or other means of attachment, with a snap-on cover or lid. This assembly is considered an indoor assembly. In an exemplary arrangement, this assembly would be installed from a routing closet down a hall and into the dwellings with one fiber-subunit dropped off at each dwelling.

A typical subunit may include either one or more tight buffer optical fibers, several strength members such as aramid fibers and an outer subunit jacket. Any distribution cable arrangement as described above would typically include a plurality of such subunits, grouped into larger arrangements having seven or twelve subunits (i.e. six subunits around one subunit or nine subunits around three subunits which both would form substantially circular arrangements). These larger multi-subunit arrangements may then be stranded and bound to hold them together.

Such arrangements of bound subunits with no jacket are essentially based on designs taken from the internal components of typical jacketed cables, with the jacket simply being eliminated from the design. However, the design concerns of the internal components for a jacketed cable are different than those that are applicable to a jacketless assembly of bound subunits (for indoor overhead conduits). The internal components of a jacketed cable are typically arranged for addressing issues such as compression resistance, ability to bend within the jacket without attenuation, etc. . . .

For example, in the prior art, the lay length of the subunits and lay length of the binder existed for needs of a cable (with a jacket). In such prior art cables the lay length of the subunits would typically be 3-4 inches uni-directionally helical, with either no binder or with an overlapping mylar tape of about a 1 inch lay. Such an arrangement is prepared for robustness and not for mid-span entry, which is not a significant consideration in most cable designs.

In contrast to this, for jacketless assembly of bound subunits (for indoor overhead conduits), these issues are not as pressing. Rather, jacketless assemblies of bound subunits for indoor use, are primarily concerned with the robustness to be fed into overhead conduits (without coming apart) while being able to have frequent mid-span access to remove a subunit from the plurality of bound subunits in the arrangement.

As result of this situation, in the prior art when jacketless assemblies of subunits are simply designed based on the same criteria as the internal components of a jacketed cable, the arrangement and binding of the subunits is not particularly well suited for indoor use requiring frequent mid-span access.

These prior art cabling arrangements taken from jacketed designs makes it difficult or time consuming to break one individual tight buffer fiber subunit out of the subunit assembly (e.g. for connection and/or connectorization to some desired location).

OBJECTS AND SUMMARY

The present invention overcomes the drawbacks associated with the prior art and provides a fiber optic cable having a plurality of tight buffer fiber optic sub-units, where any one of the subunits may be easily removed from the sub-unit assembly without disturbing the remainder of the subunits. This ease of accessibility is especially important in an installation where the work will be done by a person on a ladder.

The arrangement provides a bound assembly of subunits that is very loosely held together for organization and handling in distribution/installation settings, such as to be insertable into the typical rectangular conduits with snap-on covers. At the same time, the subunit assembly is configured so that a subunit may be easily removed in sufficient length at any desired apartment door or when it is otherwise aligned with the point at which is needed to enter the dwelling as it goes down a hall without significant damage to the cabled subunits. Further the subunit is cut some distance past or further down the hall from the unit and a significant length is pulled back up to the unit to enable a sufficient length be available to be inserted through the wall into the dwelling unit.

The assembly is likewise constructed to that at any one point, a subunit may be withdrawn from the larger subunit assembly at a point up to six feet away from the cut in the subunit.

To achieve this, the assembly is stranded using a light S-Z type helical stranding with a loosely applied wide flat binder as described in more detail below.

To this end an assembly of fiber optic elements includes at least two subunits, each of which has at least one fiber optic unit and a flat binder wrapped over the subunits into an arrangement. The at least two subunits are stranded in a SZ arrangement at a first lay length and the binder is stranded over the subunits in a uni-directional helical lay at a second lay length. The payoff tension and the first lay length of the subunits, combined with a payoff tension and the second lay length of the binder are simultaneously sufficient to hold the subunits within the arrangement, while being loose enough to allow a single subunit to be removed without destroying the arrangement.

BRIEF DESCRIPTION OF THE DRAWINGS

The present invention can be best understood through the following description and accompanying drawings, wherein.

DESCRIPTION

Figure 1:
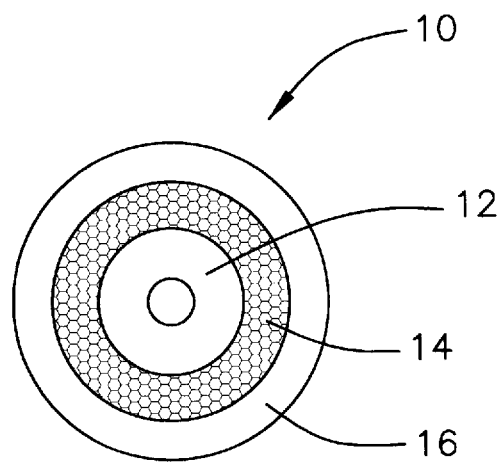
FIG. 1 is a cross section of an exemplary subunit according to one embodiment.

In one arrangement, as shown in FIG. 1, an exemplary fiber subunit 10 is shown having a tight buffer optical fiber 12, several aramid strength members 14 around the tight buffer and a subunit jacket 16 of extruded polymer such as PVC (Polyvinyl Chloride), FRPVC (Fire Resistant Polyvinyl Chloride), PE (Polyethylene), FRPE (Fire Resistant Polyethylene), PVDF (Polyvinylidiene Fluoride), FEP (Fluoronated Ethylene Polymer) or PP (Polypropylene).

Figure 2:
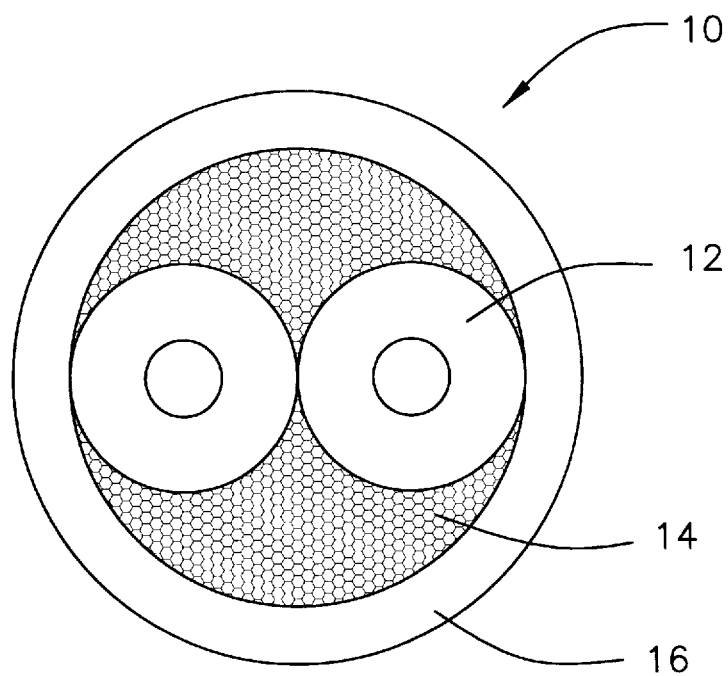
FIG. 2 is a cross section of an exemplary subunit according to an alternative embodiment.

In another example of a subunit 10, FIG. 2 shows subunit 10 with two tight buffer fibers 12 therein. Fibers 12 are surrounded by the same aramids 14 and included within a similar subunit jacket 16. Such a subunit 10 shown in FIG. 2, may be used for example, if being installed in an apartment/dwelling, and there is a requirement to get two fibers to each unit.

Figure 3:
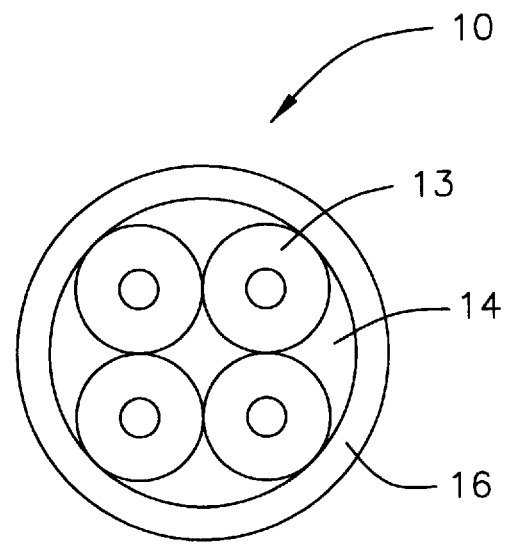
FIG. 3 is a cross section of an exemplary subunit according to an alternative embodiment.

In another example of a subunit 10 design, shown in FIG. 3, subunit 10, instead of having tight buffer fibers 12, includes four UV coated optical units 13 loosely held within subunit jacket 16 (acting similarly to buffer tubes in other loose tube arrangements). Like subunits 10 in FIGS. 1 and 2, aramids 14 may be included within subunit jacket 16.

Such an arrangement for subunit 10 shown in FIG. 3 may be used when a larger number of fibers are needed per unit, such as in a commercial/business setting.

It is noted that, subunit 10, as shown in FIG. 1, is used to illustrate the salient features of the invention. However, subunit 10 may be formulated differently with different materials as desired, e.g. to meet certain mechanical and fire resistance standards, etc. . . . , depending on the desired installation requirements.

Figure 4:
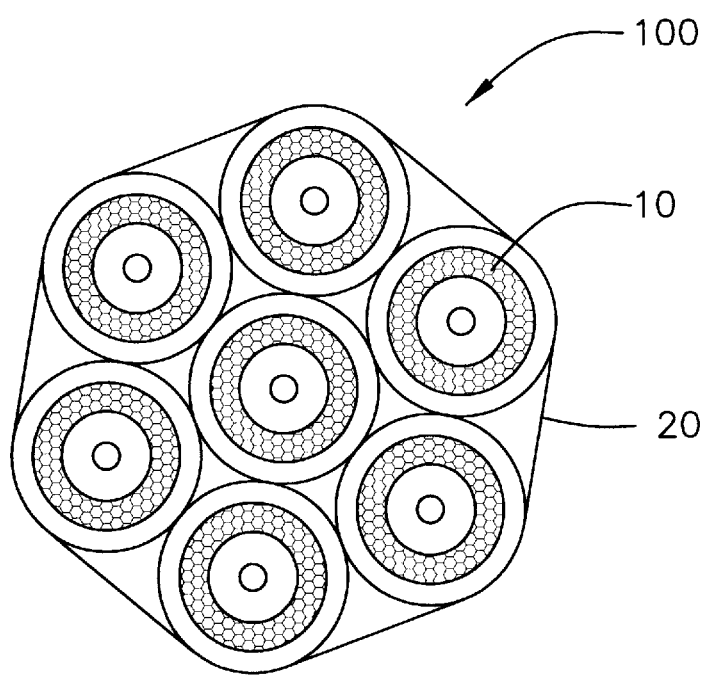
FIG. 4 is a cross section of an exemplary arrangement according to one embodiment.
Figure 5:
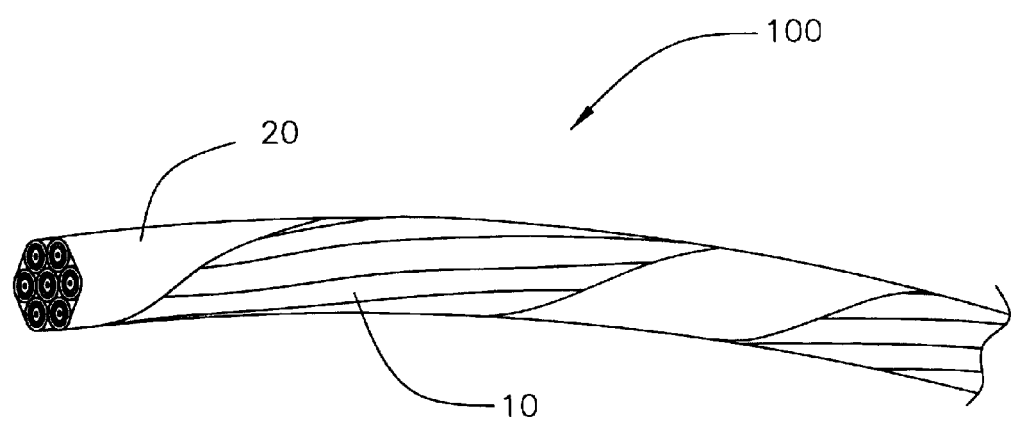
FIG. 5 is longitudinal view of the arrangement of FIG. 4 according to one embodiment.

In one arrangement as shown in FIGS. 4 and 5, a fiber optic arrangement 100 is shown having an exemplary seven subunits 10 (six subunits around one subunit—hexagonal shape). FIG. 5 shows the longitudinal view of the same arrangement from FIG. 4. In this arrangement, each of subunits 10 are cabled around each other in an S-Z arrangement as described in more detail below. A binder 20 is wrapped around stranded subunits 10 to hold S-Z stranded assembly 100 in place. For the purposes this application, subunit assembly 100 has seven subunits 10, however the features of this application may be applied to more or fewer of stranded subunits as desired.

Figure 6:
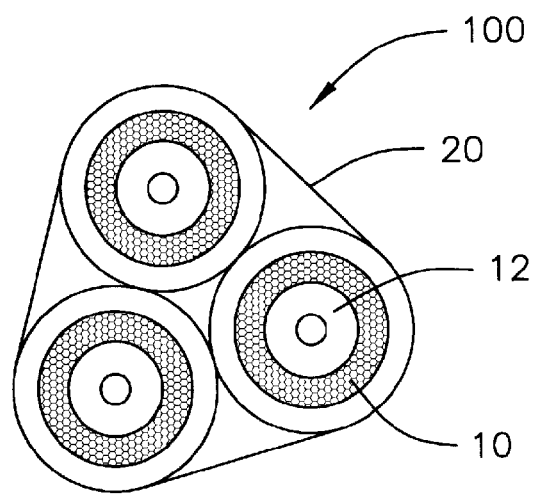
FIG. 6 is a cross section of an exemplary arrangement according to an alternative embodiment.
Figure 7:
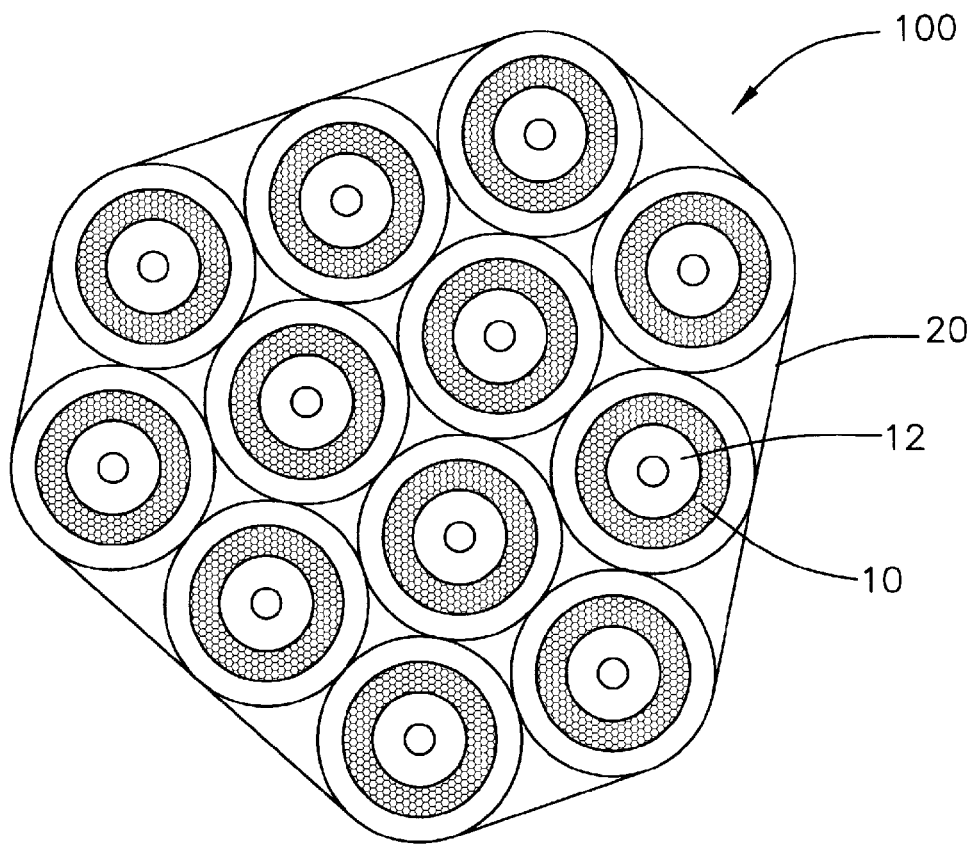
FIG. 7 is a cross section of an exemplary arrangement according to an alternative embodiment.
Figure 8:
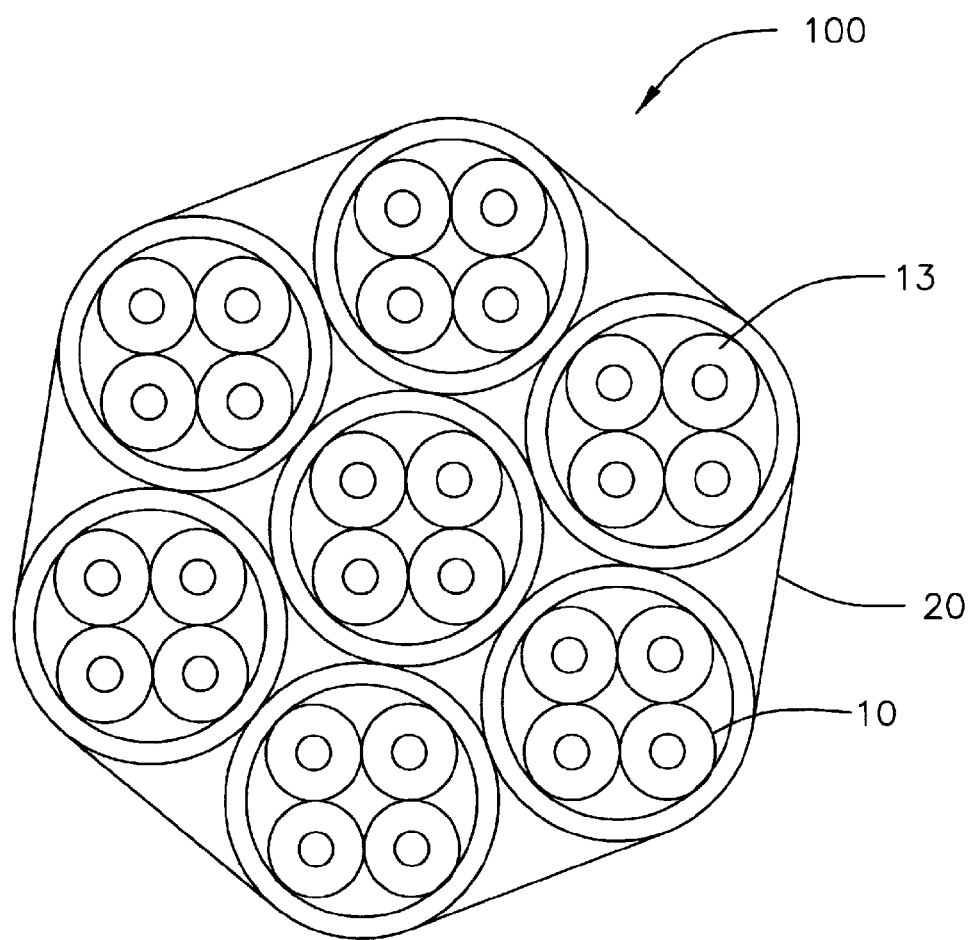
FIG. 8 is a cross section of an exemplary arrangement according to an alternative embodiment.

For example, FIGS. 6-8 show alternative versions of assembly 100 that have more or less subunits 10 (FIGS. 6 and 7) or subunits 10 of a different construction (FIG. 8 with assembly 100 made from subunits 10 shown in FIG. 3).

Specifically, FIG. 6 shows an alternative arrangement where three subunits 10 with one tight buffer 12 each, are held in one arrangement 100. FIG. 7 shows an alternative arrangement where twelve subunits 10 with one tight buffer 12 each, are held in one arrangement 100. FIG. 8, shows an alternative arrangement where seven subunits 10, each with four UV coated fibers 13, are held in one arrangement 100. Obviously, there is any number of possible configurations for arrangement 100. For the purposes of illustrating the salient features of the invention, the arrangement from FIGS. 4 and 5 is used throughout this application.

It is noted that payoff tension refer to the tension applied to the component during the cabling operation where the component subunits are unspooled, collected, stranded, bound and re-spooled as assembly 100. In one embodiment, as shown in FIGS. 4 and 5, subunits 10 are assembled in the production line into arrangement 100 using substantially 500 grams of (subunit) payoff tension and a 1-2 ft subunit lay length (S-Z stranding) having 1 turn between S-Z switchbacks. In this same embodiment, as shown in FIG. 5, binder 20 is preferably a one ¼ inch wide flat water swellable binder that is applied to the subunit arrangement 100 using 250-500 grams of binder tension with a 2-3 inch binder lay length (uni-direction helical stranding).

Binder 20 is made in similar fashion to other binders used in cabling, where numerous filaments are gathered into a yarn. By "flat" binder 20, the present arrangement contemplates that the yarn is constructed and applied so that the filaments of the yarn spread out to a flat (nearly flat oval) shape as opposed to the typical application of such binder yarns which are applied with a circular cross section. By "water swellable," the present arrangement contemplates that the filaments of yarns of binder 20 are coated in a water swellable powder or agent.

As such, arrangement 100 includes two separate lay lengths. The first lay length is a gentle 1-2 ft subunit lay length (S-Z stranding) for subunits 10. For this lay length for subunits 10, the lay length is limited to be no more relaxed (longer) than the expected circumference of the coil/spool on which arrangement 100 is wound.

For a 2 ft coil circumference (7.64" diameter) the lay length of subunits 10 is also not longer than 2 ft. This prevents one subunit 10 from being stretched relative to the other subunits 10 as it is coiled in storage and transit. As such, the lay length of 1-2 ft, is longer than a typical lay length, but not so long as to prevent the core of subunits 10 in arrangement 100 to simply become mis-arranged altogether.

The second lay length is the uni-directional helical lay length for binder 20 around subunits 10. For example, binder 20 according to one arrangement has a lay length of 2-3 inches. A longer lay length may result in binder 20 slipping (going into a straight line with subunits 10). A tighter lay length for binder 20 may hold subunits 10 too tightly, preventing the desired mid-span access as described below.

It is understood that the above lay lengths are for typical small subunits 10 having one or two fiber elements 12 therein. Larger subunits 10 with more fibers 12 may require modifications to the lay length of binder 10 in order to maintain the desired balance of effects.

In accordance with the arrangement set forth above, the light S-Z stranding (1-2 ft lay length) of subunits 10 combined with the looser longer lay length and light binder tension of 250-500 grams for binder 20, allows arrangement 100 to relax after assembly, resulting in relatively zero to very low tension in subunits 10 under binder 20.

Moreover, by having only 250-500 grams binder 20 tension applied over the relatively long S-Z lay lengths of subunits 10, the normal force on subunits 10 is low, allowing for subunits 10 to be securely held together in arrangement. 100 but still loose enough to enable each subunit 10 to be individually pulled out over long distances (for installation) as discussed below.

For example, as shown in FIG. 5 (not to scale), the angle between subunits 10 and binder 20 overlaying is about 2 and 7 degrees depending on the number of subunits 10 and assuming the 2 to 3 inch subunit 10 lay length. In other words, drawing an axis down the longitudinal direction of any particular subunit 10 within arrangement 100, the overwrapped binder 20 will cross over that subunit 10 at an angle relative to the longitudinal axis of subunit 10 at between 2 and 7 degrees. With the given payoff tensions for binder 20 and subunits 10, this translates to a normal tension in weight imparted on subunits 10 of approximately 20 to 63 grams.

In fact, because subunits 10 are not stiff (lower modulus in the range of 1800-2800 Young's constant modulus) and can bend in a curved path allowing an even lower angle relative to binder 20, resulting in a sidewall pressure on jackets 16 of subunits 10 of substantially 10 to 30 grams. Furthermore, as arrangement 100 is relaxed or payoff tension is removed after binding, subunits 10 contract, allowing binder 20 to likewise contract rendering a low to zero tension binding.

In another embodiment, binder 20 is a polyester (or similar) 4×1500 denier polyester units made into a ¼ inch wide ribbon. (Denier is a unit of measure for the linear mass density of fibers. It is defined as the mass in grams per 9,000 meters) Flat binder 20, owing its flatness to either its initial shape or it being a flattened oval binder, is advantageous because it has a better binding effect at lighter tensions so that the arrangement 100 is still held in place along its length, while not using too strong a binding tension that would prevent mid-span access to subunits 10.

Additionally, water swellable binder 20 provides a somewhat irregular non-tacky and or dry lubricated surface which facilitates the removal of subunits 10. Additionally, other non-water swelling powders impregnated into resin that hold the four 1500 deniers fibers together for binder 20 may also be used. In other words, binder 20 is essentially similar in feel as "a cloth binder or bandage" that delicately holds arrangement 100 together and not damage or stick when one subunit 20 is pulled out from arrangement 100.

Figure 9:
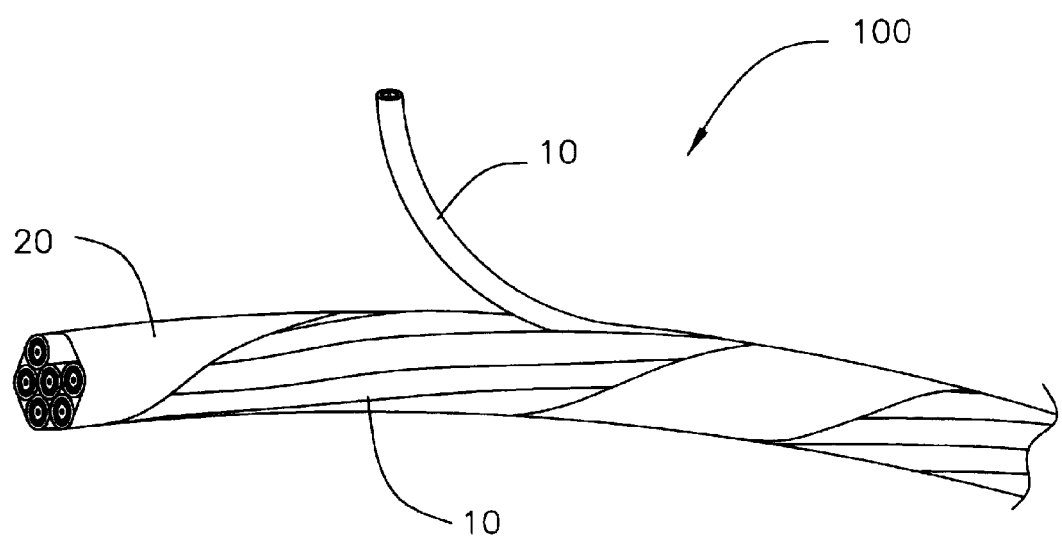
FIG. 9 is longitudinal view of the arrangement of FIG. 4 with a subunit removed for mid-span access according to one embodiment.

As shown in FIG. 9, according to the present arrangement, such an assembly of subunits 100 allows for one single subunit 10 to be easily removed from the larger subunit assembly 100 within binder 20 by cutting that one subunit 10 at a given point, and then sliding an end of that subunit 10 out of binder 20 at a point up to six feet or more away from the cut.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. An assembly of fiber optic elements, said assembly comprising:
   at least two subunits, each of which having at least one fiber optic unit therein; and
   a binder wrapped over said subunits into an arrangement, wherein said at least two subunits are stranded in a S-Z arrangement at a first lay length of substantially 1-2 feet, said binder is stranded over said subunits in a uni-directional helical lay at a second lay of substantially 2-3 inches such that a subunit payoff tension and said first lay length of said subunits, combined with a binder payoff tension and said second lay length of said binder, with the subunit payoff tension of said subunits being higher than or equal to the binder payoff tension of said binder, is simultaneously sufficient to hold said subunits within said arrangement, while being loose enough to allow a single subunit to be removed without substantially disturbing said arrangement.

2. The assembly as claimed in claim 1, wherein said subunit includes a tight buffer optical fiber, a plurality of aramid strength yarns and a subunit jacket.

3. The assembly as claimed claim 2, wherein said subunit includes multiple tight buffer optical fibers.

4. The assembly as claimed in claim 1, includes a plurality of UV coated optical fibers, a plurality of aramid strength yarns and a subunit jacket.

5. The assembly as claimed in claim 1, wherein, said binder is a polyester binder made from four 1500 denier polyester units arranged in a ¼ inch wide ribbon.

6. The assembly as claimed in claim 5, wherein said binder includes a water swelling agent.

7. The assembly as claimed in claim 1, wherein said subunits are arranged in an S-Z stranding of substantially 1-2 ft. lay length.

8. The assembly as claimed in claim 7, wherein said subunits are arranged in an S-Z stranding using substantially 500 grams of payoff tension.

9. The assembly as claimed in claim 1, wherein said binder is arranged in a uni-directional helical standing of substantially 2-3 inches in lay length.

10. The assembly as claimed in claim 9, wherein said binder is arranged in a uni-directional helical standing using substantially 250-500 grams of payoff tension.

11. The assembly as claimed in claim 10, wherein said subunits are at an angle of substantially 2-7 degrees relative to said binder.

12. The assembly as claimed in claim 9, wherein said subunits are held within said binder under a sidewall pressure of 10-63 grams.

13. A method for installing a subunit of the assembly as claimed in claim 1, said method comprising the steps of:
   arranging said assembly within a conduit or tray by pushing or pulling said arrangement into place;
   identifying at least one subunit to be removed from said assembly;
   cutting said identified subunit to allow for sufficient amount of subunit to reach desired location;
   at said desired location, removing said cut subunit by pulling said subunit from said binder; and
   installing said removed cut subunit at said desired location.

14. The assembly as claimed in claim1, further comprises a coil/spool on which arrangement comprising said subunits and said binder, is wound, the first lay length being limited to be equal to or less than the circumference of the coil/spool.

* * * * *